United States Patent [19]

Persicke

[11] 4,079,924
[45] Mar. 21, 1978

[54] SHOCK ABSORBER

[75] Inventor: Gunter Persicke, Market Drayton, England

[73] Assignee: Road Research Limited, London, England

[21] Appl. No.: 717,373

[22] Filed: Aug. 24, 1976

Related U.S. Application Data

[63] Continuation-in-part of Ser. No. 555,344, Mar. 5, 1975, abandoned.

[30] Foreign Application Priority Data

Mar. 8, 1974 United Kingdom ............... 10564/74

[51] Int. Cl.² .......................... F16F 9/08; F16F 9/346
[52] U.S. Cl. .................................... 267/116; 188/288; 267/64 R; 293/70
[58] Field of Search ................... 267/64 R, 64 A, 64 B, 267/65 R, 65 A, 116, 118, 120, 121, 124, 128, 136, 139; 188/269, 286, 288, 298, 314, 316; 213/43, 223; 293/1, 60, 70, 85, 86, DIG. 2

[56] References Cited

U.S. PATENT DOCUMENTS

| 2,774,447 | 12/1956 | De Carbon | 188/269 |
|---|---|---|---|
| 3,151,706 | 10/1964 | Dillenburger et al. | 188/269 X |
| 3,157,396 | 11/1964 | Long | 267/64 B |
| 3,628,638 | 12/1971 | Curchack | 267/128 X |
| 3,853,311 | 12/1974 | Kreuzer et al. | 293/70 X |
| 3,869,163 | 3/1975 | Dera et al. | 293/85 X |
| 3,870,130 | 3/1975 | Miller | 267/120 X |
| 3,910,565 | 10/1975 | Persicke et al. | 267/65 R X |

FOREIGN PATENT DOCUMENTS 886,782  1/1962  United Kingdom ................ 188/288

Primary Examiner—Johnny D. Cherry
Attorney, Agent, or Firm—Karl W. Flocks

[57] ABSTRACT

A shock absorber comprising a cylinder closed at one end and resiliently deformable radially outwards at a predetermined internal pressure, a resilient liner within the cylinder in intimate contact with the wall of the cylinder, a fluid-tight seal at the open end of the cylinder, a piston rod extending through the seal, a piston in the cylinder and connected to the rod and in sliding engagement with the inner wall of the liner, an impact receiving member on the free end of the rod outside the cylinder; a liquid of predetermined flow characteristics in the cylinder, and at least one zone extending over a substantial length of the stroke of the piston and having a cross section varying over at least part of the length to form a single free liquid flow path past the piston, the configuration of the zone, the flow characteristics of the liquid, the pressure in the closed end of the cylinder and the resilience of the material of at least one of the cylinder and the liner resulting in shocks being absorbed by the shock absorber in accordance with predetermined characteristics.

5 Claims, 3 Drawing Figures

SHOCK ABSORBER

This is a continuation-in-part of application Ser. No. 555,344 filed Mar. 5, 1975, now abandoned.

BACKGROUND OF THE INVENTION

1. Field of the Invention

This invention relates to shock absorbers for use on vehicle bumper bars, on highway guard rail posts and for other purposes where absorption of impact forces, shocks or vibration is required.

2. Description of the Prior Art

Shock absorbers are known consisting of telescopic members such as pistons and cylinders with resilient means or displaceable or compressible fluids to retard relative movement between the members and thus damp or absorb shock on one of the members while the other member is supported by a fixed structure.

Such known shock absorbers often damp or absorb the shocks proportionately to the relative movement between the members. Where a varying resistance to a shock is required additional means such as springs or additional pistons and cylinders are employed but such constructions are complicated and expensive to manufacture as well as increasing the liability to failure due to the number of parts.

The main object of the present invention is to provide a simple form of shock absorber which can be assembled with predetermined characteristics to accommodate resistance in a predetermined sequence to a wide range of shocks.

SUMMARY

According to the present invention a shock absorber comprises a cylinder closed at one end and resiliently deformable radially outwards at a predetermined internal pressure, a resilient liner within said cylinder in intimate contact with the wall of said cylinder, a piston rod extending through said seal, a piston in said cylinder and connected to said rod and in sliding engagement with the inner wall of said liner, impact receiving means on the free end of said rod outside said cylinder; a liquid of predetermined flow characteristics in said cylinder, and at least one zone extending over a substantial length of the stroke of said piston and having a cross section varying over at least part of the length to form a single free liquid flow path past said piston, the configuration of said zone, said flow characteristics of said liquid, the pressure in the closed end of said cylinder and the resilience of the material of at least one of said cylinder and said liner resulting in shocks being absorbed by the shock absorber in accordance with predetermined characteristics.

Where the maximum pressure to which the liquid in the cylinder is to be subjected is not in excess of 20,000 lbs. per sq. in. the liquid may be oil, but many oils above such maximum pressure rapidly reach flashpoint and then the shock absorber would be unsuitable from the point of view of safety. The liquid may partly fill the cylinder so that as soon as the shock absorber is subjected to a shock or impact the rapid movement of the liquid with the gas e.g. air in the cylinder creates an emulsion; alternatively the liquid may be an emulsion which is a compressible fluid such as a water based emulsifiable fluid. In fact, practically any fluid is usable providing it has the correct characteristics. However it is known that any fluid has a velocity on accelerating when subjected to a shock in a confined space such as a cylinder, and a velocity on decelerating when the force of the shock is removed. It is known that high operation velocities can result in alterations of a fluid's characteristics, due to the rapid generation of heat, when the change in the velocity of the fluid is high. In order to obtain satisfactory performance in a shock absorber using an hydraulic fluid, be it a liquid or an emulsion, the characteristics of the liquid must remain unchanged up to fluid velocity acceleration or deceleration of 39g.

In one preferred construction a recoil spring or other resilient means is provided between the cylinder and the piston to urge the piston to return to its rest position after displacement.

In another construction using the resilient cylinder and resilient liner the piston rod is hollow and a second piston is slidingly disposed therein, a liquid flow path is provided past the first named piston to the space in the rod above the second piston, the second piston is slidably disposed with respect to a member fast at one end with the first piston, the end of the piston rod remote from the pistons having a vent through which excess liquid can escape, the second piston guide rod being shorter than the piston rod interior whereby after an initial displacement of the second piston it moves off the guide rod leaving a bore therethrough so that liquid can pass to the vent in the piston rod.

DESCRIPTION OF PREFERRED EMBODIMENTS

Figure 1:
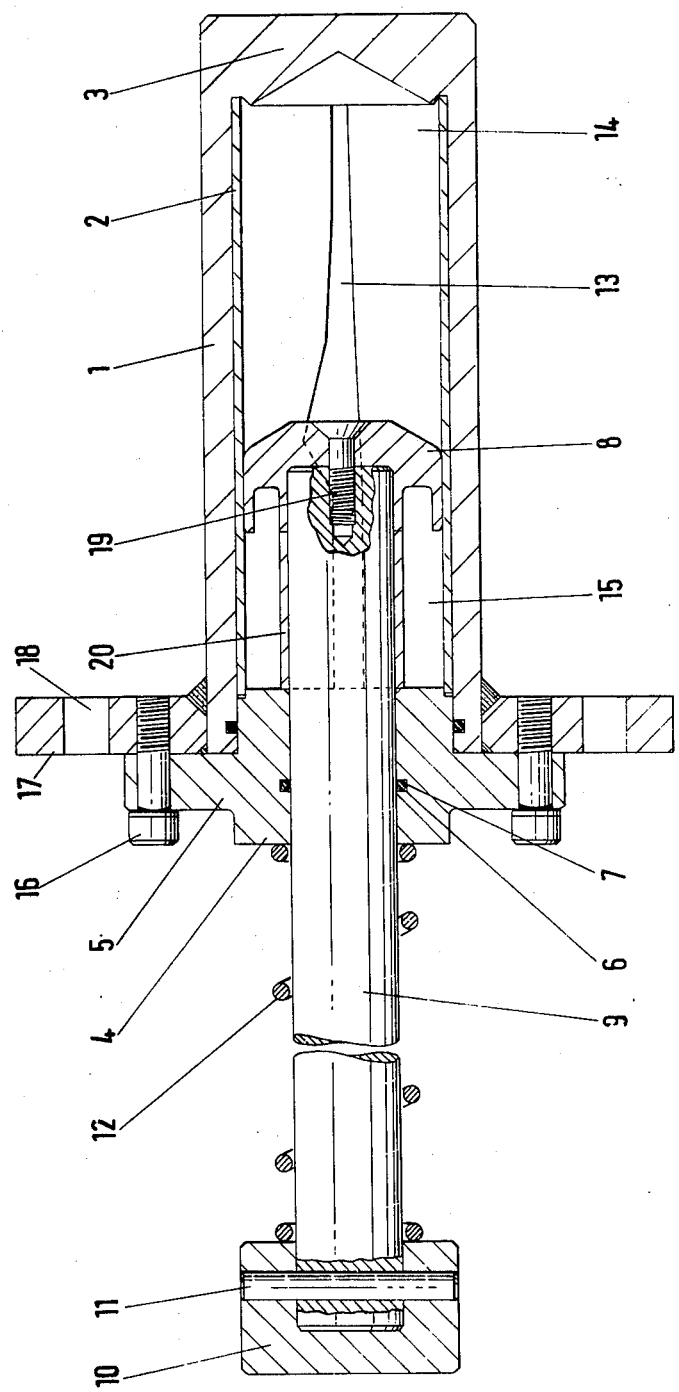
FIG. 1 is a cross section through a shock absorber.

Referring to FIG. 1 this shows a shock absorber having a cylinder 1 within which is a liner 2 in intimate contact with the cylinder wall. The head end of the cylinder 3 is closed and in the drawing is shown as closed by a piece solid with the cylinder wall but it may be a separate cap applied to the wall in a fluid tight manner. The other end of the cylinder is closed by a block 4 having a flange 5 which will be referred to later. Within the flange is an annular groove 6 housing a sealing ring 7. Sliding within the liner is a piston 8 connected to a piston rod 9 which slides through the seal 7 which in fact forms a fluid tight seal round the rod 9.

The other end of the rod 9 is provided with a member 10 fixed to it by a pin 11 or in any other way, the member 10 forming an impact receiving element. This may be connected to the bumper bar of a vehicle where the absorber is for use in absorbing shocks on the bumper bar. If the absorber is used to absorb other shocks then the member 10 may be connected to any member which is receiving a shock vibration or impact or the member 10 may itself be shaped to receive such a shock.

Between the member 10 and the flange 4 and surrounding the rod 9 is a coiled spring 12 initially compressed and urging the piston 8 to the left hand end of the cylinder in FIG. 1.

The liner 2 has a longitudinal slot 13 which forms a zone in the liner wall, or it may be in the cylinder wall or it may be a combination of the liner wall and the cylinder wall. This slot as seen in FIG. 1 varies in cross section throughout its length and the purpose of the slot is to permit a liquid in the head 14 of the cylinder to flow past the piston into the space 15 in the cylinder when the piston is displaced to the right in FIG. 1 as a result of an impact or shock on the member 10.

It can be seen that the shape of this slot 13 can have any configuration according to the desired flow of liquid from the head 14 to the space 15 and thus can control the speed of movement of the piston 8 along the cylinder but there is no seal between the piston and the liner so that if the pressure in the cylinder rises beyond a safe value, the liquid can escape past the piston.

Moreover the cylinder wall is of resiliently deformable material which will yield when a predetermined pressure differential exists on its opposite faces, but which will restore to its original shape when that pressure differential is removed. Suitable material for the cylinder wall is tensile steel of a thickness of 2.6 mms for an internal cylinder diameter of 4 cms. Similarly the liner must be resilient so that on a predetermined pressure within the cylinder it will yield radially and/or longitudinally of the cylinder thus creating an increase in the liquid flow path past the piston. The yield point of the liner is preferably lower than the yield point of the cylinder wall but when the pressure within the cylinder transmitted through the liner to the cylinder wall reaches the cylinder yield point the cylinder wall will expand radially thus increasing the flow path past the piston. When the pressure within the cylinder falls, the cylinder wall will contract to its initial shape and dimensions ensuring that the liner even if of self restoring material is returned to its initial condition. Suitable liner material is steel and for the above example of the cylinder the liner wall thickness is preferably 1.5 mms. Other materials may be used such as polytetrafluoroethylene.

The cylinder wall and/or the liner wall may be of varying thickness over their length so that they can be designed to offer varying resistance to expansion at different points in the stroke of the piston in a predetermined manner according to the required characteristics of the shock absorber. This variation in wall thickness may be provided by forming recesses or slots within but not through the wall thickness.

The liquid employed in the cylinder head 14 is selected with the appropriate characteristics of viscosity at the temperature at which the shock absorber is designed to operate, but it must be borne in mind that while oil such as buffer oil would be suitable at temperatures well below its flashpoint, such as room temperature, in a temperature climate, nevertheless many oils over a pressure of 20,000 lbs. per sq. in. are reaching their flashpoint and therefore they are dangerous if the absorber is to absorb shock creating pressures of that magnitude or is operating in hot climates. It is of course understood that if the whole of the cylinder head and the space 15 were filled with oil, the oil is incompressible and therefore displacement of the piston on shock or impact would be entirely damped by the flow of oil through the slot 13. If, however, the liquid is a mixture of a liquid such as buffer oil and a gas such as air, then these may be either in the form of an emulsion or they may be separately disposed in the cylinder and when the impact causes rapid movement of the piston, the increase in pressure will be such that the gas and the liquid will rapidly be converted into an emulsion. A suitable emulsion for use in the absorber is a water based emulsifiable fluid. Such emulsions have a compressibility as well as providing variation of the rate of flow past the piston.

The flange 5 is provided with bores round its periphery through which bolts 16 are passed into apertures in a flange 17 attached to the cylinder wall 1 and itself having spaced bores 18 therethrough by which that flange may be secured to any firm base. In the case of the bumper of a road vehicle being connected to the member 10 the flange 17 can be bolted to the chassis of the vehicle or other parts.

The piston 8 has a head which is bolted by a bolt 19 to the piston rod 9 and the tail 20 of the piston extends along the rod 9 to give stability to the connection between the piston head and the rod.

Figure 2:
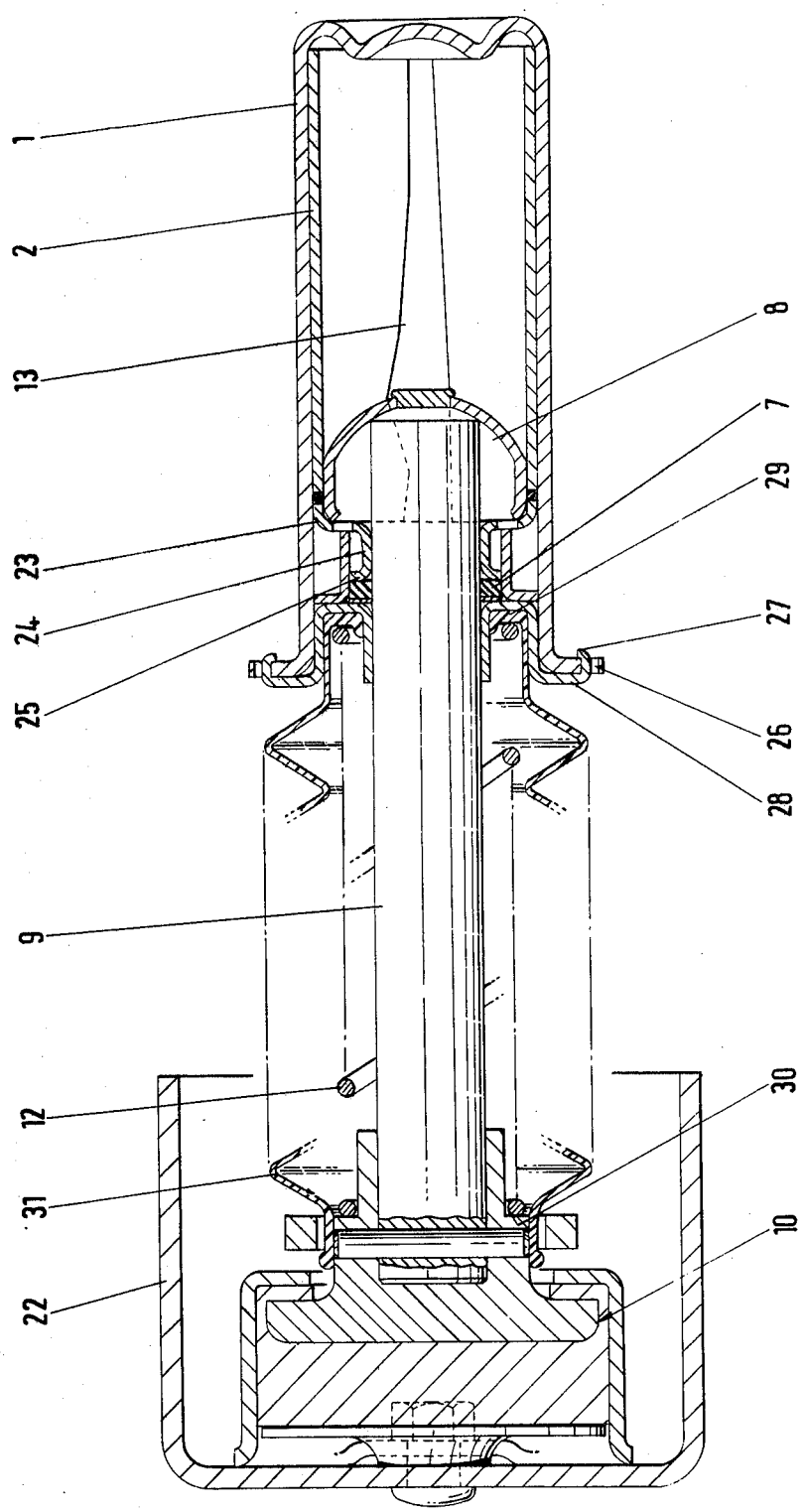
FIG. 2 is a cross section through another shock absorber.

Referring to FIG. 2 this has a cylinder 1 with the liner 2 having its slot 13, the cylinder being made of pressed sheet metal or drawn tube capable of yielding within its elastic limit at a predetermined pressure within the cylinder. The piston 8 slides in the liner and is connected to a piston rod 9 having at its far end a member 10 chain bolted to a vehicle bumper 22. The rod 9 extends through a fluid-tight seal 7 and the end of the liner 2 is inwardly bent at 23 and then along and in sliding engagement with the cylinder rod 9 at the portion 24 being outwardly turned at 25 to form a flange strengthening the end of the liner and abutting against the sealing ring 7.

The cylinder has slots 26 through which tags 27 on a closure ring 28 can pass. The closure ring is U-shaped round the rod 9 and abuts at its front end against the ring 7. Within the U-shaped portion is a block 29, preferably a resilient block, forming an abutment against which a spring 12 engages, the other end of the spring engaging against the end flange 30 of the member 10. The spring is surrounded by a concertina type cover 31 which precludes any leakage of oil and at the same time forms a dust cover over the spring and round the rod 9.

The shape of the slot 13 is comparable to that in FIG. 1 and it will be understood that it will function in the same way as that described with reference to FIG. 1. Similarly the cylinder wall and the liner have the characteristics of deformation described with reference to the construction shown in FIG. 1.

Figure 3:
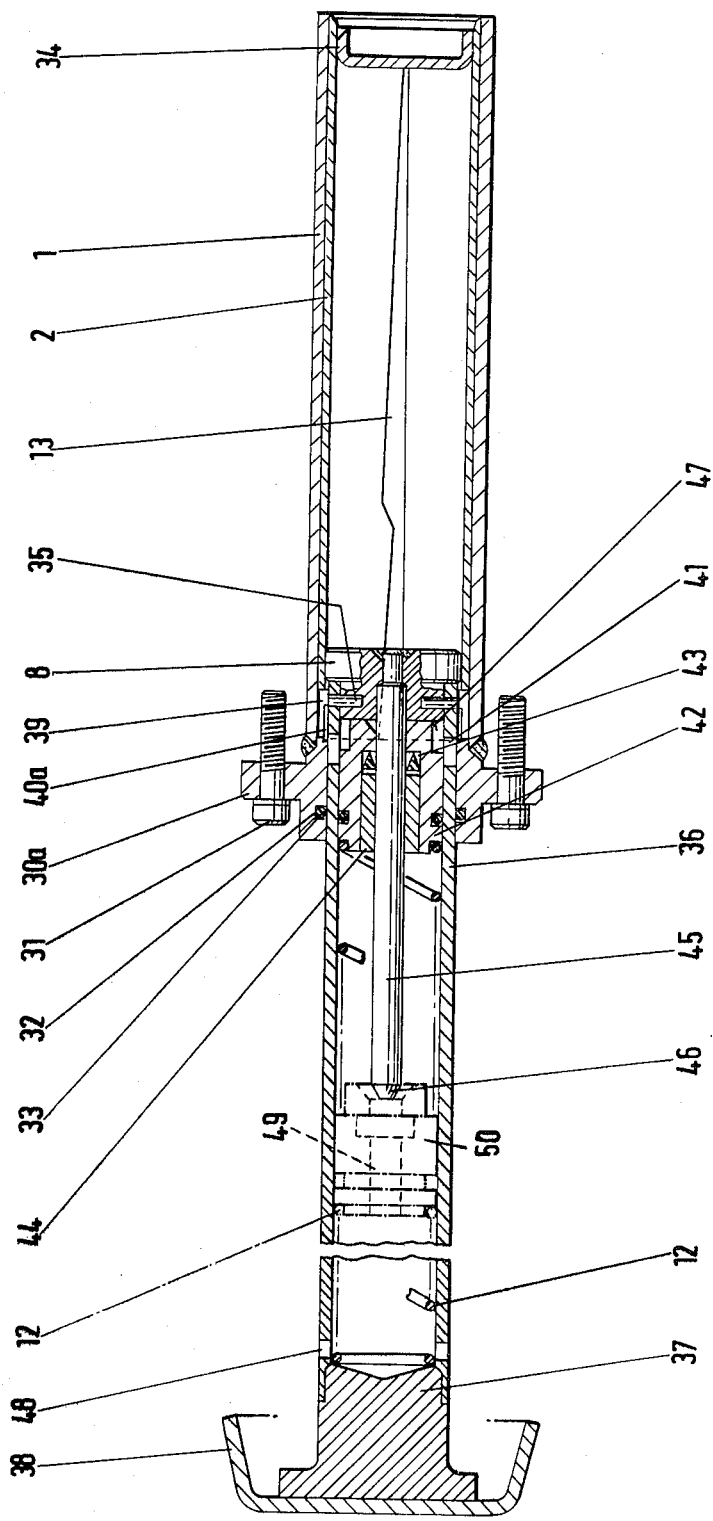
FIG. 3 is a cross section through a third shock absorber.

Referring to FIG. 3 this shows another form of shock absorber having a cylinder 1 with its liner 2 having the slot 13 and a piston herein called the main piston 8 sliding in the liner. The cylinder is closed by an end cap 30a having bores to receive screws 31 by which the shock absorber can be fixed to a firm structure. The cap 30a has a groove 32 in which is a sealing ring 33. The other end of the cylinder is sealed by a cap 34 or it may be a solid end as in FIG. 1. The cylinder and liner are constructed and have the characteristics of deformation as those in FIG. 1.

The piston 8 is connected by pins 35 to a tubular piston rod 36, the other end of which has a cap 37 secured to an impact receiving means such as a vehicle bumper bar 38.

The slot 13 in the liner 1 terminates in an annular passage 39 inside the cylinder wall and outside the rod 36 and a passage 40a leads from the annular passage 39 to a series of apertures 41 round the rod 36 communicating with the interior of the rod.

Within the rod 36 is a second piston 42 having a central aperture 43 arranged longitudinally thereof in which is disposed a sealing bush 44 and this bush and the piston 42 are slidably disposed on a guide member 45 terminating with a tapered end 46 seated on the tapered end of the bore 49 in a valve body 50 fixed in the rod 36, the member 45 being fixed at its other end to the piston 8. The second piston 42 is urged in contact with the first piston 8 by a spring 12 engaged between the end 37 of the rod 36 and the periphery of the second piston 42. This spring is under initial compression and urges the piston 42 against the piston 8.

In operation when an impact is applied to the bumper 38, the rod 36 is caused to slide with the piston 8 in the liner 2 and the fluid in the head of the cylinder to the right of FIG. 3 flows through the slot 13 into the passage 39 and from there through the passage 40a and the apertures 41 into the passage 47 round the second piston thus urging the second piston to the left in FIG. 3 compressing the spring 12 while sliding on the guide member 45. Should the impact be such that the time the second piston is clear of the tapered end 46 of the guide member 45, the piston rod 36 will continue to travel to the right in FIG. 3 and the fluid passing through the aperture 41 into the space 47 will continue to force the piston 42 to the left in FIG. 1 compressing the spring 12. The shock absorber is calibrated including using a cylinder, a liner and a liquid or liquid and a gas as described above so as to absorb a shock of a given magnitude on the member 38 before the piston 8 engages the end cap 34 of the cylinder. If during this operation the piston 42 does clear the end 46 of the guide member 45, the fluid in the rod 36 round the rod 45 will pass through the bore 49 in the valve block 50 in the rod 36 and into the space within the rod to the left of the block 50 in FIG. 3 and any excess can pass out of the vent apertures 48 at the end of the rod 36.

As soon as the impact has been absorbed and the pressure is taken off and the cylinder and liner have returned to their initial conditions the member 38, the spring 12 will reassert itself or these effects may occur simultaneously forcing the piston 42 back into its rest position shown in FIG. 3 and the fluid will be forced by the returning piston in the reverse direction into the head of the main cylinder 1.

In FIG. 3 the slot 13 and the fluid used within the cylinder and rod will be as described with reference to FIGS. 1 and 2.

It will be seen that by the constructions described a great control of the impact is possible with shock absorbers in accordance with this invention. The cylinder construction allows for a controlled expansion and hence variation of the area of the liquid flow path past the piston in both directions of movement of the piston in the cylinder so that the liquid flow rate through said path may be automatically varied and hence providing a shock absorber capable of offering varying resistance to a wide range of shock valves.

I claim:

1. A shock absorber comprising a cylinder closed at one end and resiliently deformable radially outwards at a predetermined internal pressure, a resilient liner within said cylinder in intimate contact with the wall of said cylinder, a fluid-tight seal at the open end of said cylinder, a piston rod extending through said seal, a piston in said cylinder and connected to said rod and in sliding engagement with the inner wall of said liner, impact receiving means on the free end of said rod outside said cylinder; a liquid of predetermined flow characteristics in said cylinder, and at least one zone extending over a substantial length of the stroke of said piston and having a cross section varying over at least part of the length to form a single free liquid flow path past said piston, the configuration of said zone, said flow characteristics of said liquid, the pressure in the closed end of said cylinder and the resilience of the material of at least one of said cylinder and said liner resulting in shocks being absorbed by the shock absorber in accordance with predetermined characteristics.

2. A shock absorber according to claim 1 wherein said liquid partly fills said cylinder, the remainder of the cylinder containing gas and said liquid with said gas in said cylinder forms an emulsion when the shock absorber is subjected to shock.

3. A shock absorber according to claim 1 wherein the flow of said liquid in operation to absorb a shock will be controlled to within an acceleration and deceleration rate characteristic of 39g.

4. A shock absorber according to claim 1 wherein resilient means are disposed to react on said cylinder and said piston to return said piston to an at rest position in said cylinder after displacement.

5. A shock absorber according to claim 1 wherein said piston rod is hollow, a second piston is slidingly disposed in said hollow piston rod, a liquid flow path is provided past said first named piston to a space in said rod on the high pressure side of said second piston, a guide member is disposed fast at one end with said first named piston and disposed to close a valve mounted in said hollow rod, said second piston is slidably disposed with respect to said guide member, a vent is provided in the end of said piston rod remote from said pistons through which excess liquid can escape, said guide member on said second piston being shorter than said hollow piston rod interior such that after initial displacement of said second piston by a force on the shock absorber said guide member opens a valve in said rod leaving a bore through which said liquid can pass to said vent.

* * * * *